Sept. 16, 1958     E. SCHREIBER     2,852,010
DEVICE FOR REDUCING THE LUBRICATING OIL CONSUMPTION
OF TWO-STROKE INTERNAL COMBUSTION ENGINES
Filed June 29, 1955
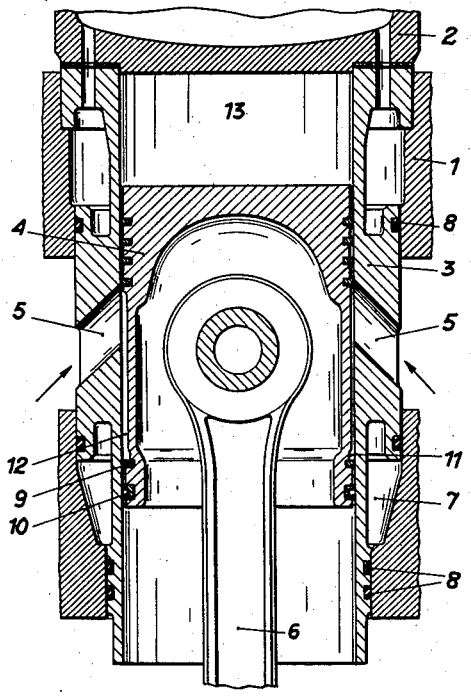
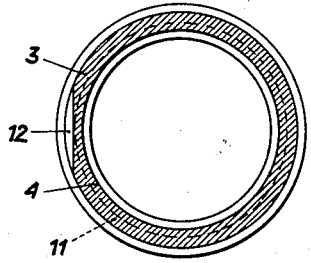
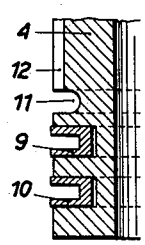 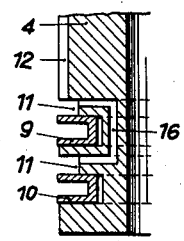
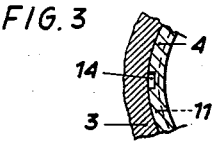

United States Patent Office 2,852,010
Patented Sept. 16, 1958

2,852,010

DEVICE FOR REDUCING THE LUBRICATING OIL CONSUMPTION OF TWO-STROKE INTERNAL COMBUSTION ENGINES

Erich Schreiber, Graz, Austria, assignor to Hans List, Graz, Austria

Application June 29, 1955, Serial No. 518,892

Claims priority, application Austria July 2, 1954

3 Claims. (Cl. 123—65)

As is well known, the proper lubrication of cylinder bores is difficult to achieve on account of the risk of excessive lubricating oil consumption due to the overflow of large amounts of lubricant from the interior of the crankcase alongside the cylinder bore over the piston sealing surfaces and piston-ring sealing surfaces into the combustion chamber. This danger is increasingly present in two-stroke internal combustion engines with piston-controlled exhaust ports since lubricant may also be lost through the exhaust ports. On the other hand, the amount of oil passing between the cylinder bore and the piston is of paramount importance for the entire lubricating oil consumption of the engine.

The lubricating oil passes into the cylinder or exhaust ports partly as a result of the speed of the droplets when flung from the crankshaft, partly due to the viscosity forces and partly through temporary overpressure of the crankcase gases.

Most of the known measures to reduce the consumption of lubricating oil aim at spraying the smallest possible amount of oil in the crankcase, especially directly onto the cylinder bore. The practical application of such measures, such as the provision of oil collecting surfaces frequently not only failed to bring about any reduction of the oil consumption, but even lead to an increase of same. This apparently surprising result is explained by the simultaneous increase of the overflow speed at the piston which produces the opposite effect as far as the lubricating oil consumption is concerned.

It has also been suggested to produce an underpressure in the crankcase by means of a special pump in order to reduce the pressure heads which are responsible for the overflow. The disadvantage of this method resides in the fact that the crankcase must be hermetically sealed at such points as do not usually require particular sealing, which results in a further increase of costs and for example, in hindering the checking of the oil level or the refilling of oil.

In conjunction with four-stroke engines a design has become known where the passage of oil between the piston, the piston-rings and the cylinder bore is stopped by compressed air. For that purpose, the piston has an annular peripheral groove running perpendicular to the piston axis at a distance from the oil scraper ring which is about equal to one third of the piston diameter, said annular groove being supplied with compressed air through an axial groove in the piston and a small bore in the cylinder. In order to positively ensure the passage of compressed air to the axial piston groove, another annular groove must be provided in the working surface of the cylinder in the area of the bore in the cylinder. A certain amount of oil is introduced at appropriate intervals into the compressed-air line for the purpose of ensuring proper lubrication of the piston.

The invention relates to two-stroke internal combustion engines with piston-controlled intake and exhaust ports. The last-mentioned design is not applicable in this case because the annular grooves would collide with the intake and exhaust ports. Although in the device according to the present invention an annular groove in the piston is supplied with air above atmospheric pressure through an adjacent axial conduit in the piston and a passage opening in the cylinder, ending in said conduit, the intake ports, however, serve as a passage opening and the annular groove or grooves which are supplied with scavenging air, are located in the area of the oil scraper rings. As a result, an annular groove in the cylinder can be dispensed with on account of the relatively substantial width of the intake ports and the risk of collision between the annular groove or grooves of the piston and the intake and exhaust ports is eliminated. At the same time, however, the area which on account of its location affords the most efficient blocking against the pressure in the crankcase, is destined for the annular grooves. Another advantage resides in the fact that no additional device for the production of compressed air needed for the blocking is required.

Tests have shown that by means of the device according to the present invention the lubricating oil consumption of piston-controlled two-stroke internal combustion engines can be reduced to the desired extent.

The compressed-air supply line of the piston can consist of a flattened portion of the same which offers the advantage of easier manufacture as compared with an axial groove. Its length can be such that the annular groove or grooves are impinged by the pressure means during the entire piston stroke or it may be shorter if impingement takes place only for part of the piston stroke. In the latter case the arrangement will preferably be such as to produce impingement of the annular grooves chiefly in the area around the inner dead center of the piston.

Examples of embodiments of the invention are illustrated in the accompanying drawings in which Figure 1 shows the cylinder and piston of a two-stroke internal combustion engine with piston-controlled intake and exhaust ports, in axial center section;

Figure 2 is a section of the same on line II—II of Figure 1;

Figure 3 shows a fractional view of another embodiment in the same section as in Figure 2;

Figures 4 and 5 show further variations of the annular grooves in the area of the oil scraper rings in section.

The wet cylinder liner 3 fixed between the crankcase 1 and the cylinder head 2 has intake ports 5 controlled by the piston 4 and exhaust ports not shown. The connecting rod is designated by 6. The cylinder liner 3 is capable of expanding freely in axial direction in relation to the crankcase 1 except for the point of support. The cooling water tank 7 is sealed at the points of friction by rubber rings 8.

The piston 4 has two oil scraper rings 9 and 10. In the embodiment illustrated in Figure 1 an annular chamber 11 is directly adjacent to the upper oil scraper ring 9, said ring chamber communicating during certain piston positions with an intake port 5 through a flattening 12 of the piston. This flattening 12 is provided at the portion of the skirt of piston 4 passing over the left intake port 5. As a result, the scavenging pressure in the annular chamber 11 will be about sufficient to prevent movements of oil from the interior of the crankcase of the engine to the combustion chamber 13 and to the exhaust ports or to reduce these movements to a reasonable extent. In the embodiment according to Figure 3 the piston 4 is provided with a groove 14 instead of being flattened.

Figure 4 shows an embodiment where the annular groove 11 is located at a distance closely above the oil scraper ring 9. In the embodiment illustrated in Figure 5 two annular grooves are provided which are located directly above the oil scraper rings 9 and 10 respectively and communicate with each other through a conduit 16.

It should be noted that, of course, the pressure in the crankcase can be reduced in a manner known per se with overlapping effects in addition to the device according to the present invention.

What I claim is:

1. In a two-stroke internal combustion engine, the combination comprising a cylinder liner formed with an intake port, a cylindrical piston formed with an open end slidable axially in the liner and carrying adjacent to its open end at least one oil scraper ring, said piston being formed in its cylindrical surface adjacent an oil scraper ring with an annular groove, said piston being further formed with an axially extending indentation of its cylindrical surface defining an axial passage communicating with the groove and in certain positions of the piston with said intake port.

2. The combination defined by claim 1 including two oil scraper rings adjacent said open end of the piston, the piston being formed with a second annular groove in its cylindrical surface between said oil scraper rings and with a second axial passage establishing communication between said second annular groove and the first mentioned annular groove.

3. In a two-stroke internal combustion engine, the combination comprising a cylinder liner formed with an intake port, a cylindrical piston formed with an open end slidable in the liner and also formed adjacent to its open end with at least one oil scraper ring, said piston being formed in its cylindrical surface adjacent an oil scraper ring with an annular groove and also being formed with an axial indentation of its cylindrical surface defining a passage communicating with the groove and in certain positions of the piston with the intake port, said indentation consisting of a flattened axially extending portion of said cylindrical surface of the piston.

References Cited in the file of this patent
FOREIGN PATENTS

| | | |
|---|---|---|
| 567,825 | Great Britain | Mar. 5, 1945 |
| 147,504 | Australia | July 24, 1952 |